United States Patent
Sirek et al.

(10) Patent No.: US 9,615,510 B2
(45) Date of Patent: Apr. 11, 2017

(54) REEL MOWER HAVING BIDIRECTIONAL TURF GROOMER CAPABLE OF LEFT OR RIGHT HAND DRIVE

(71) Applicants: Nicholas John Sirek, Elko, MN (US); Gerald Eugene Goman, Spring Valley, WI (US)

(72) Inventors: Nicholas John Sirek, Elko, MN (US); Gerald Eugene Goman, Spring Valley, WI (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 14/603,059

(22) Filed: Jan. 22, 2015

(65) Prior Publication Data
US 2016/0212936 A1  Jul. 28, 2016

(51) Int. Cl.
*A01D 34/53* (2006.01)
*A01D 43/00* (2006.01)
*A01G 1/12* (2006.01)

(52) U.S. Cl.
CPC .............. *A01D 43/00* (2013.01); *A01G 1/12* (2013.01)

(58) Field of Classification Search
CPC ............ A01D 34/6806; A01D 2101/00; A01D 34/62; A01D 34/00; A01D 34/47
USPC .......................................................... 56/249
See application file for complete search history.

(56) References Cited

U.S. PATENT DOCUMENTS

| | | | | |
|---|---|---|---|---|
| 1,886,408 A | * | 11/1932 | Locke | A01D 34/46 56/15.3 |
| 2,057,417 A | * | 10/1936 | Clapper | A01D 34/43 56/199 |
| 3,758,967 A | * | 9/1973 | Thompson | A01G 1/125 15/79.1 |
| 3,816,985 A | * | 6/1974 | Sorenson | A01D 34/43 56/10.9 |
| 4,021,996 A | * | 5/1977 | Bartlett | A01D 75/306 56/17.2 |

(Continued)

OTHER PUBLICATIONS

Baroness, LM18G, 56G, 66T Greens Mowers Owner's Operating Manual & Parts Catalog, undated but admitted prior art, Cover Page, p. 10 describing bi-directional turf groomer change lever for selecting normal rotation, rotation stop or reverse rotation in section 5-6, and pp. 42-45 showing bi-directional turf groomer exploded parts view and parts list.

(Continued)

*Primary Examiner* — Árpád Fábián-Kovács
(74) *Attorney, Agent, or Firm* — James W. Miller (57) ABSTRACT

A turf groomer is coupled to a reel cutting unit in advance of the cutting reel and is powered by a gearbox having a rotary gear drive that provides alternately usable first and second drive paths capable of selectively rotating the turf groomer in opposite directions at different speeds. The rotary gear drive includes an axially slidable input gear on an input shaft. An actuator is coupled to the input gear to slide the input gear from one position in which the input gear is within the first drive path to select rotation of the turf groomer in a first direction at a first rotational speed. Alternatively, the actuator can slide the input gear into a second operational position in which the input gear is within the second drive path to select rotation of the turf groomer in an opposite direction at a different speed.

10 Claims, 7 Drawing Sheets

(56) References Cited

U.S. PATENT DOCUMENTS

| | | | |
|---|---|---|---|
| 4,878,340 A | 11/1989 | Roy et al. | |
| 5,197,267 A * | 3/1993 | Aldred | A01D 34/54 56/17.1 |
| 5,228,277 A * | 7/1993 | Smith | A01D 34/62 56/16.9 |
| 5,682,735 A * | 11/1997 | Swenson | A01D 34/54 56/17.1 |
| 6,029,433 A * | 2/2000 | Westbrook | A01D 34/62 56/249 |
| 6,834,485 B2 * | 12/2004 | Grandrud | A01D 34/6806 56/11.3 |
| 7,530,214 B1 * | 5/2009 | Rinholm | A01D 34/43 56/16.9 |
| 8,844,252 B2 | 9/2014 | Pilon, Jr. et al. | |
| 2002/0095922 A1 * | 7/2002 | Goman | A01D 34/47 56/16.7 |
| 2003/0145570 A1 * | 8/2003 | Berndt | A01D 34/003 56/6 |
| 2009/0249761 A1 * | 10/2009 | Rinholm | A01D 43/00 56/249 |
| 2009/0249762 A1 * | 10/2009 | Rinholm | A01D 34/43 56/249 |
| 2011/0192129 A1 * | 8/2011 | Hallale | A01D 34/54 56/249 |
| 2014/0215989 A1 * | 8/2014 | Pilon, Jr. | A01D 43/00 56/13.5 |

OTHER PUBLICATIONS

Jacobsen, Bi-Directional Groomer & Brush brochure, Feb. 2014, showing forward and reverse rotation of groomer on second page.

Deere, Counter-Rotating Greens Tender Conditioner Sales Brochure, Nov. 24, 2009, describing installation of the groomer gear box for left or right hand drive in the third paragraph from the bottom of p. 1.

Photographs illustrating Gear Drive for Deere Greens Tender Conditioner, undated but admitted prior art, showing gear configuration inside the groomer gear box that can be used for left or right hand drive.

* cited by examiner

REEL MOWER HAVING BIDIRECTIONAL TURF GROOMER CAPABLE OF LEFT OR RIGHT HAND DRIVE

TECHNICAL FIELD

This invention relates to a reel mower having at least one reel cutting unit and a rotatable turf groomer for additionally acting on the turf surface during a mowing operation.

BACKGROUND OF THE INVENTION

Reel mowers having one or more reel cutting units are well known for cutting grass on a turf surface. Each reel cutting unit includes a rotatable cutting reel that pushes blades of uncut grass against a sharpened bedknife to cut the blades of grass using a shearing action between the reel blades and the bedknife. A rotatable turf groomer is also known for use on the cutting unit adjacent to the cutting reel for performing one or more additional actions on the turf surface during the mowing operation for promoting the healthy growth of the grass on the turf surface. These additional actions may comprise dethatching of the turf surface, cutting horizontal runners of grass, working a fertilizer or top dressing material into the turf surface, aerating the turf surface, and the like.

Some turf groomers can be driven in a bidirectional manner to rotate either in the same direction or in a counter direction to the direction of rotation of the cutting reel. The user can select which direction of rotation of the turf groomer is used at any given time to customize the action of the turf groomer to the type and condition of the grass in the turf surface. However, in known bidirectional turf groomers, the turf groomer rotates in the same speed in either direction. In these types of bidirectional single speed turf groomers, the Applicants have discovered that the action of the turf groomer is too aggressive on the grass when rotating in a direction that is the same as the direction of forward motion of the cutting unit (the counter direction mode of operation of the turf groomer) and ends up cutting or grooming the grass in the turf surface more than is strictly needed. The Applicants have further discovered that this wastes power and is thus less efficient than would be desirable.

In addition, reel cutting units used on different mowers or different reel cutting units used on the same mower may couple the drive motors to different ends of the reel shaft due to spacing or other issues. Since the turf groomer is driven from the end of the reel shaft that is opposite to the end coupled to the drive motor, this means the drive for some turf groomers has to come off the left end of the reel shaft while the drive for the other turf groomers has to come off the right end of the reel shaft. Thus, many turf groomers are built in two different models to permit either a left hand or right hand drive of the turf groomer to accommodate the variation in how reel cutting units are driven. However, the need for two different models of turf groomers for this reason increases manufacturing complexity thus increasing manufacturing costs and the retail costs of such turf groomers. This is disadvantageous to the manufacturer and to the end user customers.

SUMMARY OF THE INVENTION

One aspect of this invention relates to a reel mower which comprises at least one reel cutting unit for cutting grass on a turf surface, the reel cutting unit having a rotatable cutting reel that pushes uncut grass against a bedknife for cutting the grass. A rotatable turf groomer is provided for additionally acting on the turf surface during a grass cutting operation. A drive system rotates the turf groomer. The drive system is selectively configurable by a user for rotating the turf groomer in a bidirectional manner either in a same direction mode of operation in which the turf groomer rotates in the same direction as a direction of rotation of the cutting reel or in a counter direction mode of operation in which the turf groomer rotates in an opposite direction to the direction of rotation of the cutting reel. The drive system is configured to provide different rotational speeds for the turf groomer depending upon which mode of operation has been selected by the user.

Another aspect of this invention relates to a reel mower which comprises at least one reel cutting unit for cutting grass on a turf surface, the reel cutting unit having a rotatable cutting reel that pushes uncut grass against a bedknife for cutting the grass. A rotatable turf groomer is provided for additionally acting on the turf surface during a grass cutting operation. A drive system is provided for rotating the turf groomer. The drive system is selectively configurable by a user for rotating the turf groomer in a bidirectional manner either in a same direction mode of operation in which the turf groomer rotates in the same direction as a direction of rotation of the cutting reel or in a counter direction mode of operation in which the turf groomer rotates in an opposite direction to the direction of rotation of the cutting reel. The drive system comprises a rotary gear drive having an input shaft and an output shaft with a connection end of the input shaft being coupled to one end of a shaft of the cutting reel for powering the rotary gear drive from the cutting reel and a connection end of the output shaft being coupled to a corresponding end of a shaft of the turf groomer for powering the turf groomer from the rotary gear drive. The rotary gear drive is substantially symmetrical about a plane extending through the rotational axes of the input and output shafts to allow the rotary gear drive to be inverted and used to drive the turf groomer in a left hand drive or a right hand drive manner.

Yet another aspect of this invention relates to a reel mower which comprises at least one reel cutting unit for cutting grass on a turf surface, the reel cutting unit having a rotatable cutting reel that pushes uncut grass against a bedknife for cutting the grass. A rotatable turf groomer is provided for additionally acting on the turf surface during a grass cutting operation. A drive system is provided for rotating the turf groomer. The drive system comprises a rotary gear drive having an input shaft and an output shaft with a connection end of the input shaft being coupled to one end of a shaft of the cutting reel for powering the rotary gear drive from the cutting reel and a connection end of the output shaft being coupled to a corresponding end of a shaft of the turf groomer for powering the turf groomer from the rotary gear drive. The rotary gear drive is substantially enclosed within a gearbox that is further linked to the reel cutting unit by a height adjuster that adjusts the height of the turf groomer relative to the turf surface. The gearbox is connected to the reel cutting unit only by the coupling of the input shaft to the cutting reel shaft and by the height adjuster to simplify the attachment of the gearbox to the reel cutting unit.

BRIEF DESCRIPTION OF THE DRAWINGS

This invention will be described more specifically in the following Detailed Description, when taken in conjunction with the following drawings, in which like reference numerals refer to like elements throughout.

DETAILED DESCRIPTION

Figure 1:
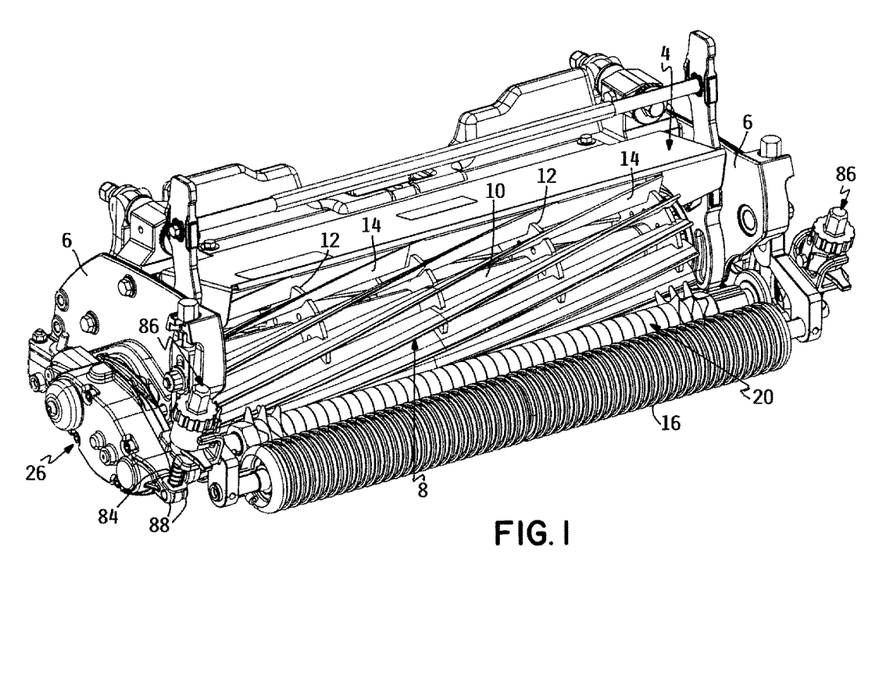
FIG. 1 is a perspective view of a reel cutting unit according to this invention.

A reel cutting unit according to one embodiment of this invention is shown in FIG. 1 generally as 2. Cutting unit 2 comprises a frame 4 which includes laterally spaced side plates 6 that are rigidly joined to one another by various cross members. A rotatable cutting reel 8 is provided having a central reel shaft 10, a plurality of laterally spaced spiders 12 welded to reel shaft 10, and a plurality of laterally extending, helically twisted reel blades 14 welded to the peripheries of spiders 12 in a circumferentially spaced manner. Opposite ends of reel shaft 10 are rotatably journalled on side plates 6 to allow rotation of cutting reel 8 about a substantially horizontal rotational axis that is coaxial with the axis of reel shaft 10. As cutting reel 8 rotates, reel blades 14 of cutting reel 8 push stalks of grass against the sharpened cutting edge of a laterally extending bedknife (not shown) that is carried on frame 4 to cut the grass in a shearing action in a manner that is well known in the art with respect to reel cutting units 2.

Cutting unit 2 is supported for movement over the ground by a front roller 16 placed ahead of cutting reel 8 and a rear roller (not shown) placed behind cutting reel 8 taken with respect to a forward motion of cutting unit 2 over a turf surface. One or more of cutting units 2 shown in FIG. 1 are coupled to or carried by a separate tractor (not shown) such that cutting units 2 are propelled over the turf surface by propulsion of the tractor. In this type of reel mower, each such cutting unit would typically have its own individual electric or hydraulic drive motor coupled to one end of reel shaft 10 for rotating cutting reel 8 with the electric or hydraulic power required for such drive motors being supplied by an electric or hydraulic power system carried on the tractor and powered by a prime mover of the tractor. However, cutting unit 2 could be part of a walk behind reel mower in which cutting unit 2 is coupled to or built as part of frame 4 of the mower with the mower frame carrying the prime mover. Thus, cutting unit 2 is not limited to the form thereof shown in FIG. 1 and may be used either singly or in multiple numbers on various types of reel mowers.

A turf groomer 20 is placed between cutting reel 8 and front roller 16. As is well known in the art, turf groomer 20 comprises a groomer shaft 22 that carries a plurality of laterally spaced cutting discs 24 along the length of groomer shaft 22. Groomer shaft 22 has outwardly extending left and right groomer shaft ends with one groomer shaft end being visible in FIG. 3. During rotation of cutting unit 2 and assuming turf groomer 20 has been placed into operation, turf groomer 20 rotates about the axis of groomer shaft 22 to cause the knife tips of cutting discs 24 to engage the turf surface. The action of the rotating cutting discs 24 on the turf surface dethatches the turf surface, cuts horizontal runners of grass, helps work in a top dressing material into the turf surface, among other things, thereby promoting healthy growth of the turf surface.

Figure 2:
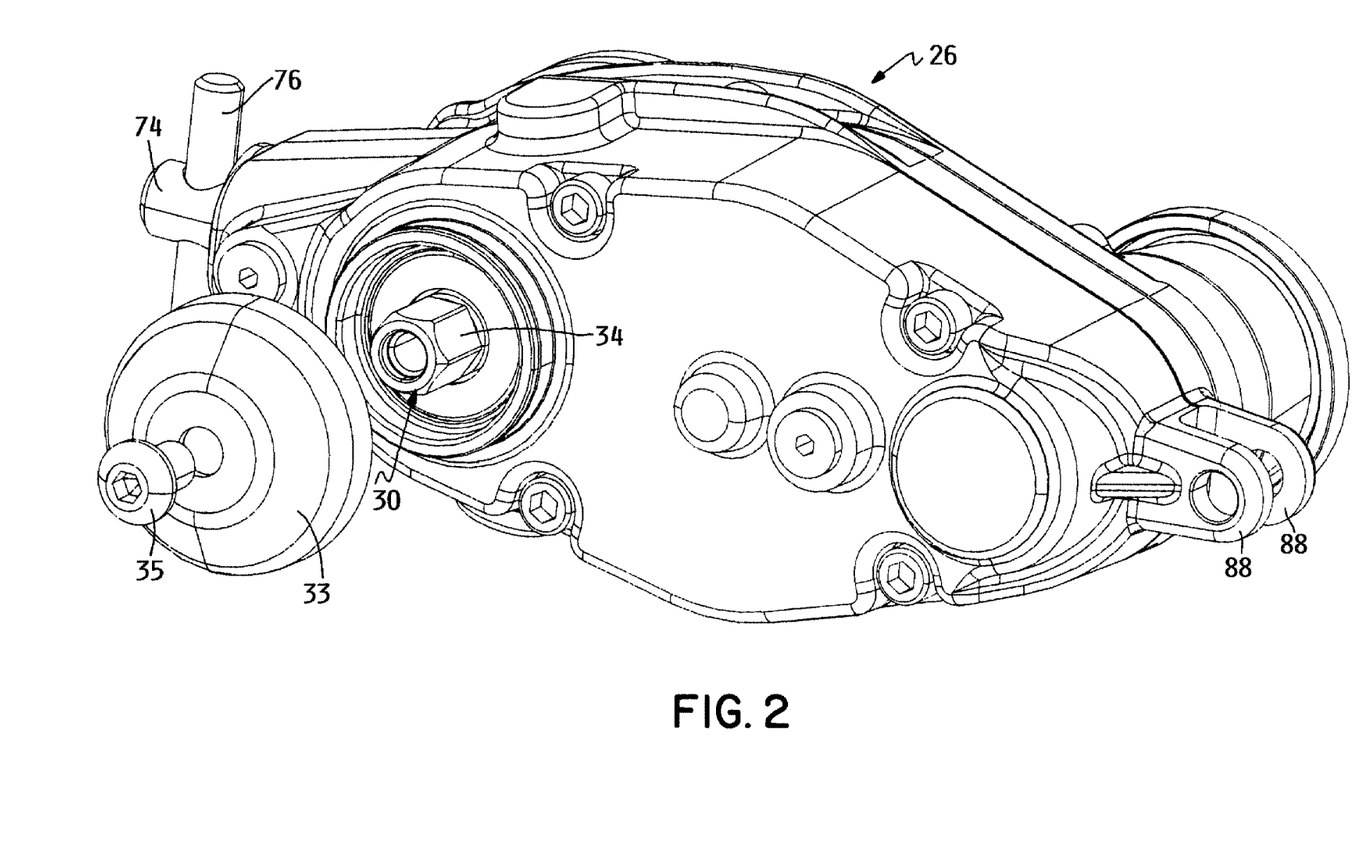
FIG. 2 is a perspective view of a gearbox that is used on the cutting unit of FIG. 1 to power or drive a rotatable turf groomer from either side thereof and in a bidirectional manner.

A gearbox 26 powers turf groomer 20 off reel shaft 10 of cutting reel 8. The gearbox is formed from two housing members that are releasably bolted to one another. When so joined, the two housing members form a hollow housing that encloses a rotary gear drive 28. Connection ends of parallel input and output shafts 30 and 32, respectively, extend or protrude outwardly through openings in one side of gearbox 26 with input and output shafts 30, 32 being rotatably journalled inside gearbox 26 in any suitable manner. See FIG. 3. In addition, input shaft 30 is long enough to extend all the way through gearbox 26 such that the opposite end of input shaft 30 is exposed and accessible to the user on the other side of gearbox 26 after a selectively removable dust cover 33 is removed. The opposite end of input shaft 30 includes a hex 34 to allow a user to apply a wrench or the like to input shaft 30 for a purpose to be described hereafter. See FIG. 2 which illustrates dust cover 33 and its attachment screw 35 in an exploded form to illustrate hex 34 on the opposite end of input shaft 30. The openings in gearbox 26 through which the above-described portions of input and output shafts 30, 32 pass are sealed by appropriate seals (not shown) to prevent leakage of any lubricant used within gearbox 26 for lubricating the operation of gear drive 28.

Turning again to FIG. 3 hereof, the connection end of input shaft 30 comprises an internally threaded bore 36. Similarly, the adjacent end of reel shaft 10 of cutting reel 8 has an internally threaded bore indicated generally at 38. Bore 38 in reel shaft 10 has a larger diameter than bore 36 in the connection end of input shaft 30. Thus, a stepped, externally threaded coupling member 40 is provided to join or couple input shaft 30 and reel shaft 10 together. Coupling member 40 has two, adjacent and contiguous, externally threaded sections 42 and 44, respectively, of different diameters suited to be threaded in the following manner into the internally threaded bores 36, 38 provided in the connection end of input shaft 30 and the adjacent end of reel shaft 10.

Figure 3:
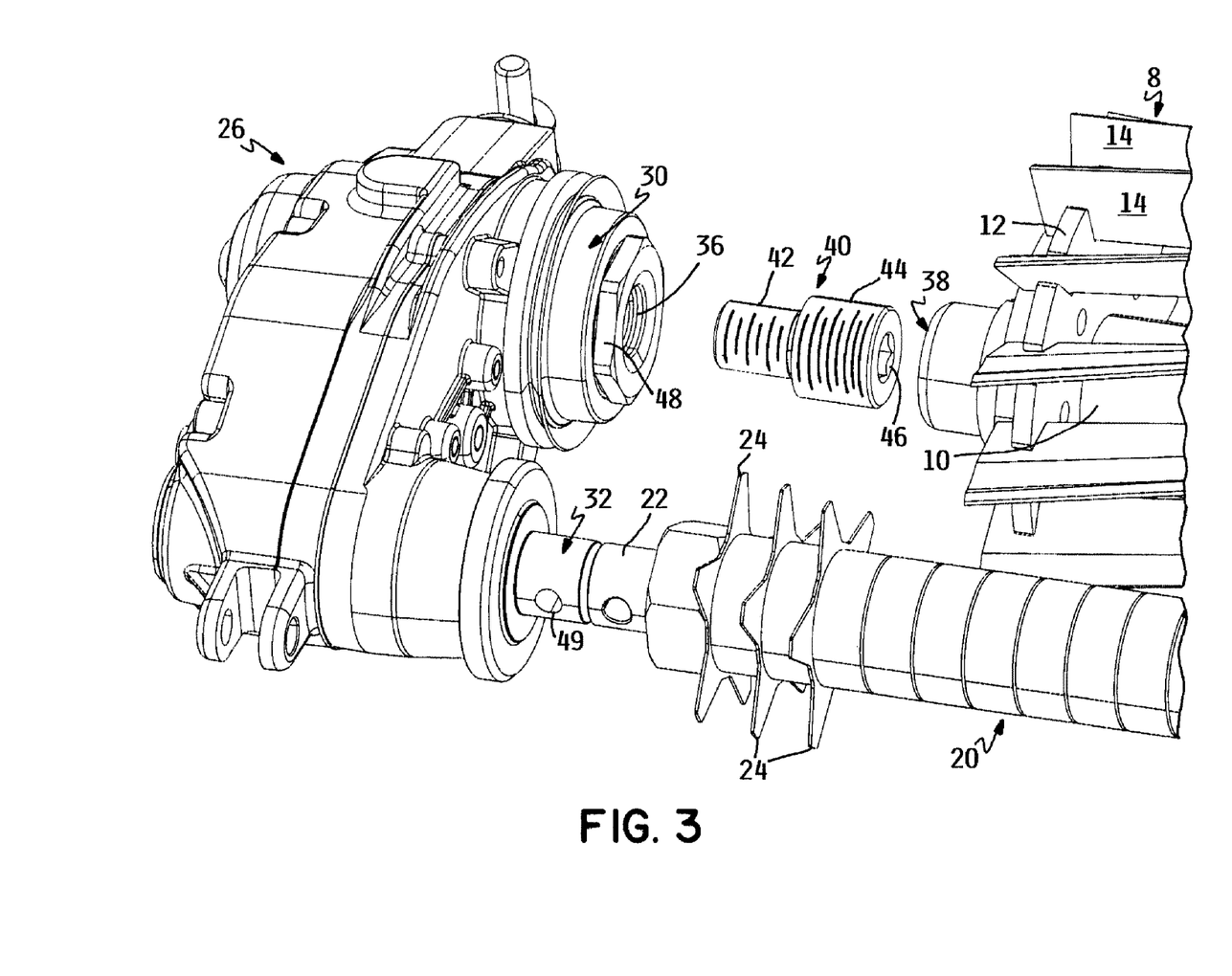
FIG. 3 is a perspective view of a portion of the cutting unit of FIG. 1, particularly illustrating the gearbox of FIG. 2, a portion of the cutting reel, and a portion of the turf groomer to show how the input shaft of the gearbox is connected to one end of the reel shaft and how the output shaft of the gearbox is connected to one end of the groomer shaft.

Smaller diameter section 42 of coupling member 40 is first threaded into bore 36 in the connection end of input shaft 30. In this regard, the interior of larger diameter section 44 of coupling member 40 has a hex shaped recess 46 to allow a user to apply an Allen wrench or the like to coupling member 40 to apply torque to coupling member 40 to screw smaller diameter section 42 of coupling member 40 into bore 36 in the connection end of input shaft 30. When doing this, the user would use a jaw type wrench to grab onto the exterior hex shape 48 on the connection end of input shaft 30 to hold input shaft 30 stationary so that rotation of coupling member 40 does not merely rotate input shaft 30 inside gearbox 26 but serves to drive coupling member 40 into threaded bore 36 in the connection end of input shaft 30. This screwing action on coupling member 40, using an Allen wrench in hex recess 46 on coupling member 40 to rotate coupling member 40 and a second jaw type wrench on the connection end of input shaft 30 to prevent input shaft 30 from rotating, is continued until coupling member 40 is tightly secured to the connection end of input shaft 30. The installation of coupling member 40 to input shaft 30 in this manner can be done entirely exteriorly of gearbox 26 and without having to disassemble gearbox 26.

Once smaller diameter section 42 of coupling member 40 is assembled to input shaft 30, gearbox 26 can then be held up next to side plate 6 of cutting unit 2 with larger diameter section 44 of coupling member 40 aligned with threaded bore 38 in the adjacent end of reel shaft 10 of cutting reel 8. The adjacent end of reel shaft 10 is accessible through an opening in side plate 6. Then, the user would apply a wrench to hex 34 on the opposite end of input shaft 30 on the exterior of the other side of gearbox 26 to apply torque to input shaft 30 to begin threading or spinning larger diameter section 44 of coupling member 40 into the threaded end of reel shaft 10. This action continues until coupling member 40 is sufficiently tightly received in reel shaft 10.

After gearbox 26 is connected to reel shaft 10 of cutting reel 8, the connection end of output shaft 32 of gearbox 26 may be connected to the adjacent shaft end of turf groomer 20. In this respect, the connection end of output shaft 32 of gearbox 26 comprises a smooth stub shaft having a bore 49 extending therethrough at right angles to the axis of output shaft 32. See FIG. 3. This permits output shaft 32 of gearbox 26 to be clamped to the adjacent shaft end of turf groomer 20 using the turf groomer drive and mounting system disclosed in US Published Patent Application 2014/0215988, which application is owned by The Toro Company, the assignee of the present invention. The application shown in this Patent Publication is hereby incorporated by reference for all the details of the drive and mounting system used for rotatably supporting turf groomer 20 on cutting unit 2, including its connection to gearbox 26.

Figure 4A:
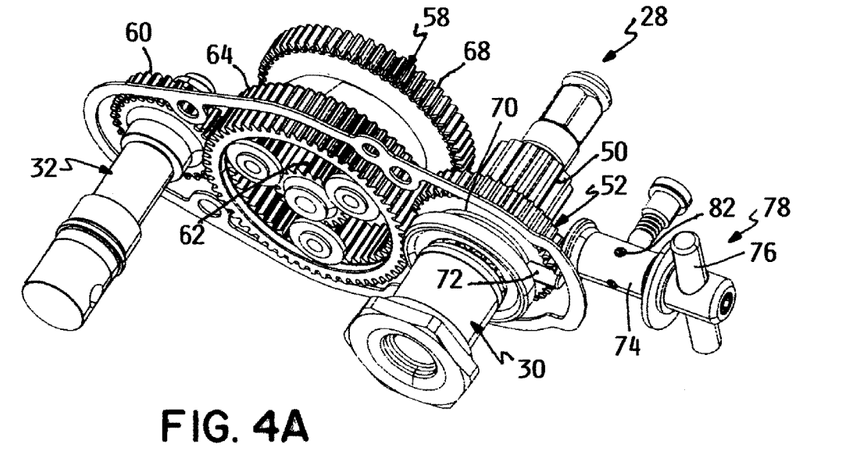
FIGS. 4A and 4B are perspective views of the rotary gear drive used inside the gearbox of FIG. 2 with FIG. 4A showing the rotary gear drive in an assembled view and FIG. 4B showing some of the gears of the rotary gear drive in an exploded view.
Figure 4B:
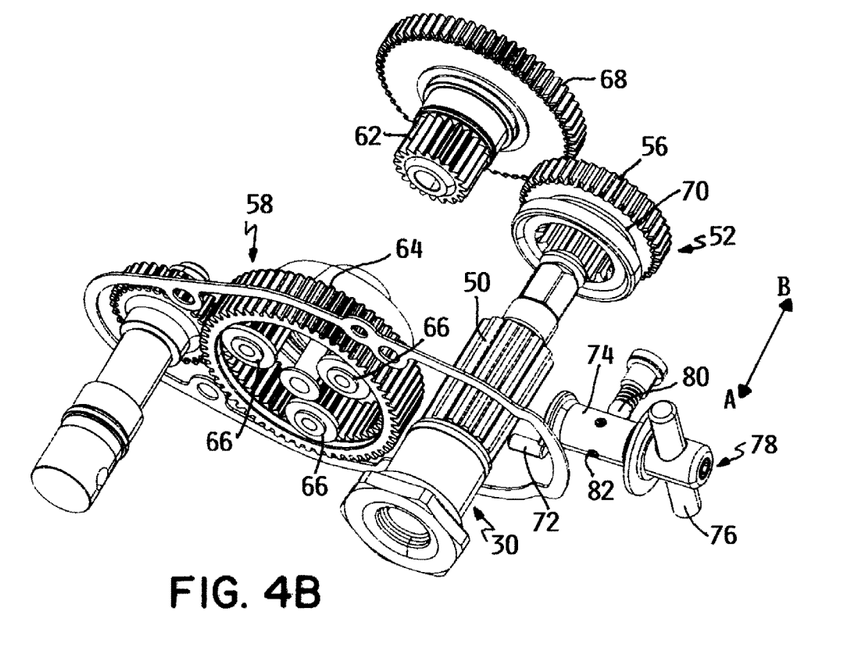

The structure and operation of gear drive 28 contained within gearbox 26 will now be described with reference to FIGS. 4-7 which illustrate gear drive 28 in isolation removed from gearbox 26. Referring first to FIGS. 4A and 4B, gear drive 28 comprises an elongated gear section 50 that is provided on a middle portion of input shaft 30. An axially slidable input gear 52 has a through bore 54 that includes inwardly extending teeth that match the shape and pitch of the outwardly extending teeth on gear section 50 so that the teeth in input gear bore 54 will mesh with the teeth on gear section 50. See FIG. 4B in which input gear 52 has been slid off gear section 50 of input shaft 30 in order to show bore 54 and the inwardly extending teeth inside input gear bore 54.

The mating configuration of the teeth on input gear 52 with the teeth on gear section 50 of input shaft 30 cause input gear 52 and input shaft 30 to be rotatively linked to one another. Whenever input shaft 30 rotates, input gear 52 will also rotate as long as input gear bore 54 is concentrically received around some portion of gear section 50 of input shaft 30 as shown in FIG. 4A. Nonetheless, due to the substantially greater length of gear section 50 of input shaft 30 compared to the length of input gear bore 54, input gear 52 can be selectively slid back and forth along the length of gear section 50 in the direction of the arrows A and B in FIG. 4B for reasons to be discussed hereafter. As is also clear from FIGS. 4A and 4B, the outer diameter of input gear 52 also carries a set of outwardly extending gear teeth 56 that will be operatively meshed with remaining portions of gear drive 28.

An epicyclic gear system 58 is provided between input gear 52 and an output gear 60 provided on output shaft 32. Gear system 58 comprises a primary sun gear 62, a ring gear 64 having gear teeth on both its inner and outer diameters, and a plurality of planet gears 66 arranged between primary sun gear 62 and the gear teeth on the inner diameter of ring gear 64. In addition, as best shown in FIG. 4B, primary sun gear 62 is part of a unitary gear member that includes a larger diameter gear that rotates in concert with primary sun gear 62 and which will therefore be referred to herein as the secondary sun gear 68. Even though secondary sun gear 68 is not technically a sun gear as planet gears 66 do not directly engage with or revolve around the periphery of secondary sun gear 68 in the manner that planet gears 66 engage with and revolve around primary sun gear 62, the "secondary sun gear" terminology will be used for convenience herein. Referring now to FIG. 4A, when gear drive 28 is assembled, the teeth on the outer diameter of ring gear 64 of gear system 58 engage and mesh with output gear 60 on output shaft 32.

Referring to FIGS. 4A and 4B, input gear 52 includes an annular, outwardly facing channel 70 circumferentially positioned around a portion of input gear bore 54 and adjacent to the outwardly extending teeth on the outer diameter of input gear 52. Channel 70 is sized to receive therein an elongated finger 72 on one end of an actuator shaft 74. Actuator shaft 74 is rotatably journalled inside gearbox 26 in any suitable manner for rotation about an axis that is substantially perpendicular to the axis of input shaft 30. Finger 72 is offset to one side of the rotational axis of actuator shaft 74 as best shown in FIG. 4B.

The opposite end of actuator shaft 74 includes a cross pin 76 that acts as a handle to allow the user to manually rotate actuator shaft 74 about its axis. In this respect, much of the length of actuator shaft 74 is located inside gearbox 26. However, the end of actuator shaft 74 having cross pin handle 76 extends outside gearbox 26 to be manually accessible to the user from a position exterior to gearbox 26 without having to disassemble gearbox 26. See FIG. 2. Obviously, actuator shaft 74 is sealed at the point at which it passes through the walls of gearbox 26 to prevent leakage of lubricant from gearbox 26.

Collectively, actuator shaft 74, finger 72 on one end of actuator shaft 74, cross pin handle 76 on the opposite end of actuator shaft 74, and the engagement between finger 72 and channel 70 on input gear 52 form a manually operable actuator, generally indicated as 78. Actuator 78 is for the purpose of sliding input gear 52 on gear section 50 of input shaft 30 between various adjusted positions along gear section 50 for selecting different operational modes of gear drive 28. Actuator shaft 74 is preferably retained in any particular adjusted position by a spring loaded detent ball 80 that is received in one of a plurality of shallow ball receiving recesses 82 disposed at 90° increments around the periphery of actuator shaft 74. Other types of detents could be used if so desired.

Figure 5A:
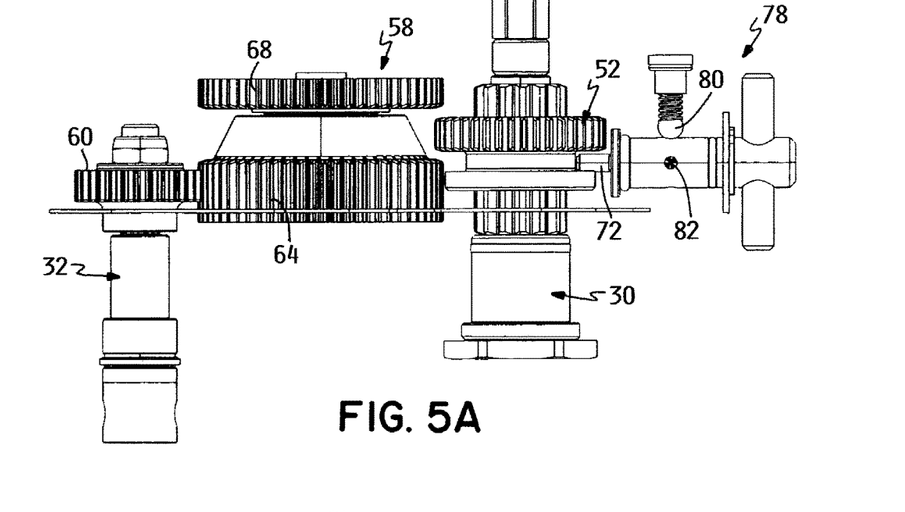
FIGS. 5A and 5B are top plan and side elevational views, respectively, of the rotary gear drive shown in FIG. 4A, particularly illustrating the rotary gear drive in an idle mode in which the input shaft of the rotary gear drive is rotating but the output shaft is stationary.
Figure 5B:
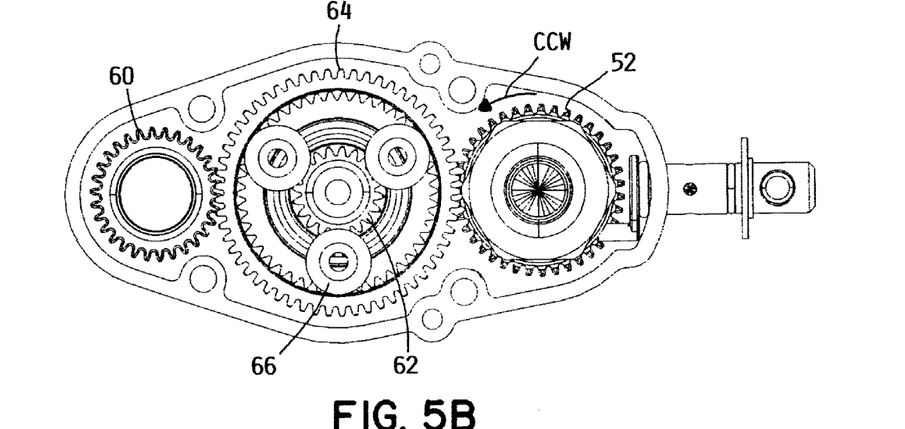

The operation of gear drive 28 will now be described with reference to FIGS. 5-7. Beginning with FIGS. 5A and 5B and assuming that reel shaft 10 of cutting reel 8 is powered, the first operational mode of gear drive 28 is an idle mode in which input shaft 30 is rotating but output shaft 32 remains stationary. This idle operational mode is achieved by manipulating actuator 78 to slide input gear 52 to a middle position thereof as shown in FIG. 5A. In this middle position, input gear 52 is positioned between ring gear 64 and secondary sun gear 68 of gear system 58 without engaging either one. Thus, assuming input gear 52 is always rotating in a counter-clockwise direction indicated by the counter-clockwise arrow CCW in FIG. 5B, none of the other gears in gear drive 28 are rotated at all since there is no driving engagement between input gear 52 and any portion of gear system 58. Accordingly, output shaft 32 remains stationary.

Figure 6A:
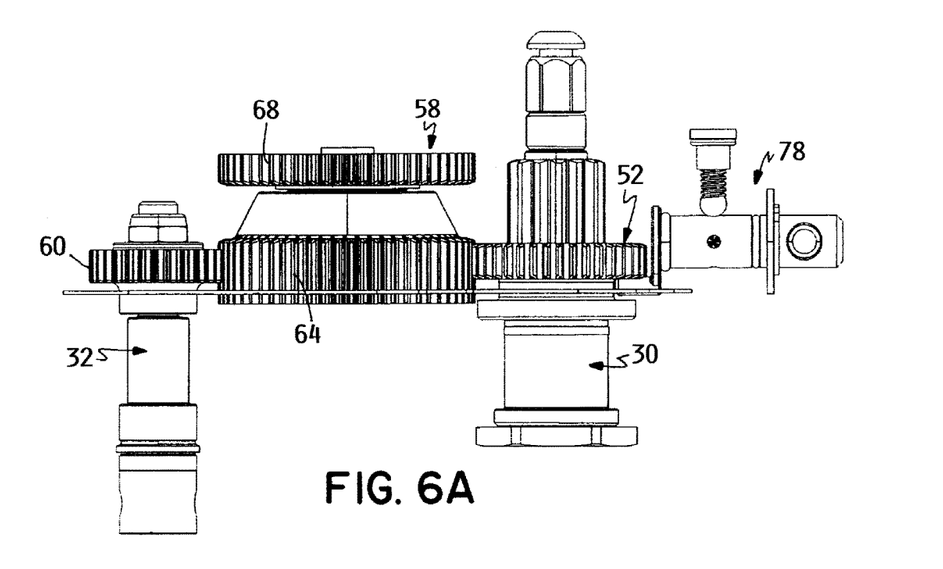
FIGS. 6A and 6B are views similar to FIGS. 5A and 5B, respectively, particularly illustrating the rotary gear drive in a same direction mode in which the input shaft of the rotary gear drive is rotating and the output shaft of the rotary gear drive is rotating in the same direction as the direction of rotation of the input shaft.
Figure 6B:
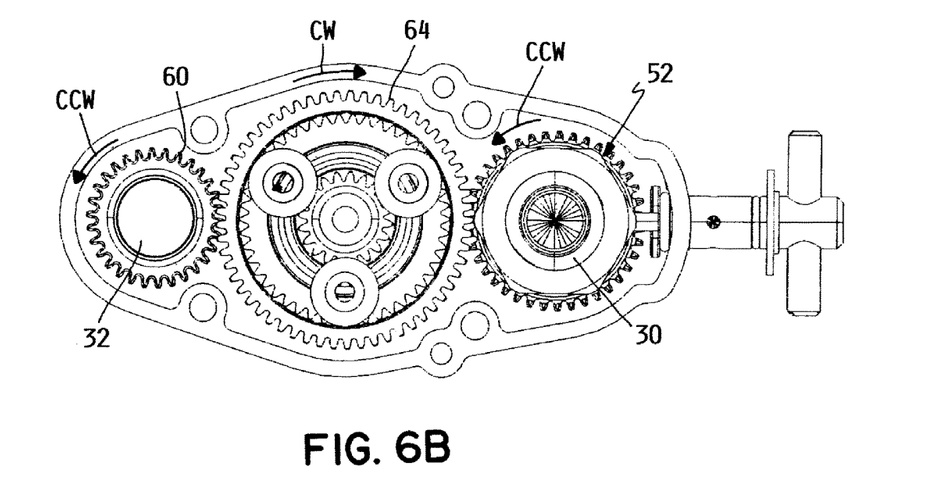
Figure 7A:
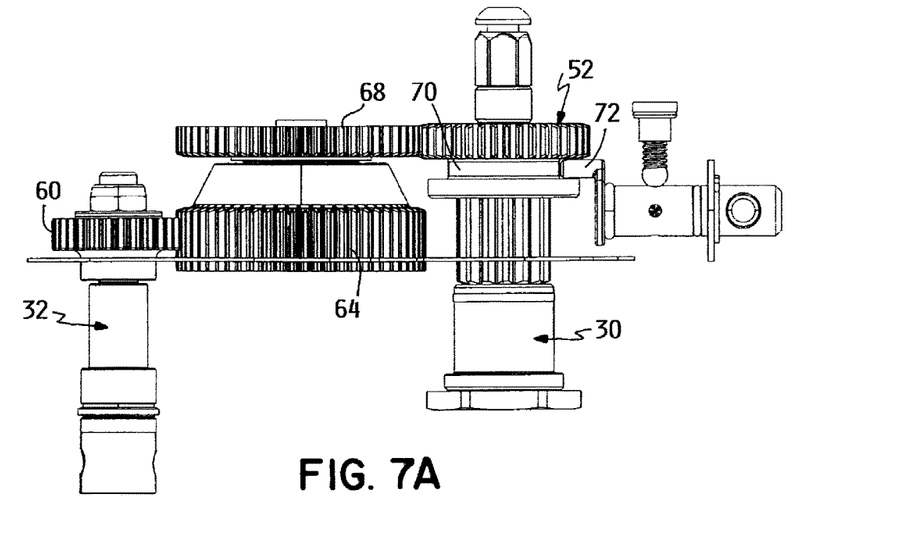
FIGS. 7A and 7B are views similar to FIGS. 5A and 5B, respectively, particularly illustrating the rotary gear drive in a counter rotation mode in which the input shaft of the rotary gear drive is rotating and the output shaft of the rotary gear drive is rotating in the opposite direction to the direction of rotation of the input shaft.
Figure 7B:
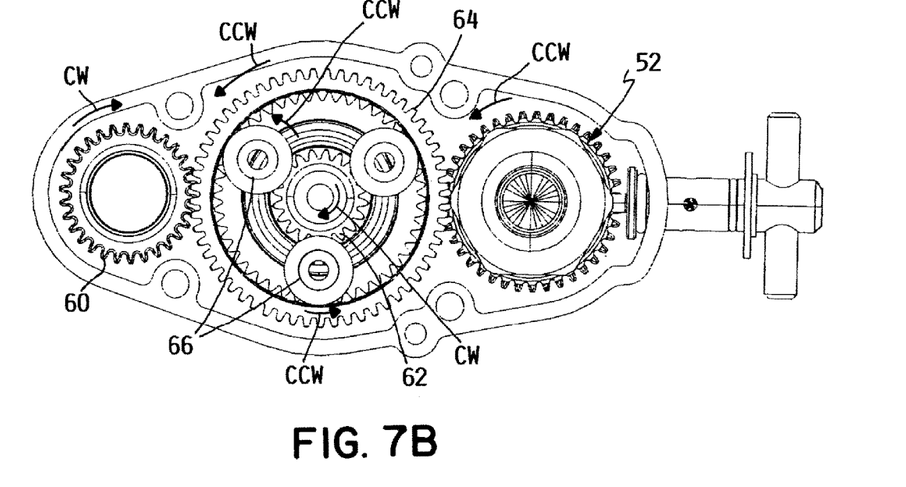

Assume now that input gear 52 has been laterally slid from its middle position into engagement with the exterior teeth of ring gear 64 as shown in FIG. 6A. This is achieved by using cross pin handle 76 on actuator shaft 74 to turn actuator shaft 74 by 90° in a first direction. This causes finger 72 on actuator shaft 74 to be displaced laterally to push laterally on input gear 52 through the interaction of finger 72 in channel 70 of input gear 52 to move input gear 52 towards ring gear 64. With input gear 52 in the laterally adjusted position shown in FIG. 6A, rotation of input gear 52 in the same CCW direction now turns ring gear 64 in a clockwise direction CW which in turn rotates output gear 60 in the same CCW direction as input gear 52. See FIG. 6B. Thus, the second operational mode of gear drive 28 is the mode just described where output shaft 32 of gearbox 26 rotates in the same direction as input shaft 30 of the gear box to cause turf groomer 20 to rotate in the same direction as cutting reel 8 of cutting unit 2.

It is true in this "same direction" operational mode as described above that ring gear rotates the planet gears 66 and thus both primary and secondary sun gears 62, 68. However, the rotation of gears 66, 62 and 68 is of consequence here since planet gears 66, primary sun gear 62 and secondary sun gear 68 end up rotating freely as idler gears in the "same direction" operational mode of gear drive 28 without driving anything. Thus, the rotation of gears 66, 62 and 68 has not been shown in FIG. 6B as such rotation is insignificant in how the driving torque is transmitted between input shaft 30 and output shaft 32. The drive between input shaft 30 and output shaft 32 ends up being a straight gear drive transmission from input shaft 30, to ring gear 64, and thence to output shaft 32 as shown by the arrows in FIG. 6B.

Assume now that actuator shaft 74 had been turned 90° in an opposite direction from the position it originally occupied in FIG. 5 compared to the direction it was turned in FIG. 6. In this scenario, the rotation of actuator shaft 74 would cause finger 72 thereon to push input gear 52 laterally away from ring gear 64 but into engagement with secondary sun gear 68. This is shown in FIG. 7A. With input gear 52 in the laterally adjusted position shown in FIG. 7A, rotation of input gear 52 in the same CCW direction now turns secondary sun gear 68 and primary sun gear 62 in a clockwise direction CW, which in turn rotates planet gears 66 in a CCW direction and ring gear 64 in a CCW direction, and finally which turns output gear 60 on output shaft 32 in a CW direction. See FIG. 7B. Thus, in this third operational mode of gear drive 28, the drive transmission actually passes from input gear 52, through the various gears in gear system 58, and through output gear 60 to rotate output shaft 32 in a direction that is opposite to the direction of input shaft 30. This reverses the direction of rotation of turf groomer 20 relative to cutting reel 8. Consequently, for a cutting reel that normally rotates in a counter-clockwise CCW direction, when input gear 52 is shifted to the position shown in FIG. 7A to select the third counter direction mode of gear drive 28, turf groomer 20 will turn oppositely in a clockwise CW direction relative to the CCW direction of cutting reel 8.

Most users will most often choose the same direction mode of operation of turf groomer 20 in which cutting reel 8 and turf groomer 20 both rotate in the CCW direction, i.e. a direction in which the bottom of cutting reel 8 is rotating toward the bedknife on frame 4 and in which the bottom of turf groomer 20 is rotating towards cutting reel 8. In this operational mode, as the bottom of cutting reel 8 removes thatch or cuts grass runners or the like, such material will be thrown by turf groomer 20 into cutting reel 8 for additional cutting between cutting reel 8 and the bedknife and for then being collected in whatever grass catcher is coupled to cutting unit 2 if a grass catcher is being used. However, as noted previously, some users, depending upon the type of grass that is growing on the turf surface or the condition of the grass, may prefer that turf groomer 20 rotate in the counter direction mode of operation. In this operational mode, the bottom of cutting reel rotates away from cutting reel 8.

In turf groomer 20 of this invention, the user can easily and quickly select which mode of operation of turf groomer 20, i.e. which direction of rotation, is used. All the user need do is manipulate actuator 78 to slide input gear 52 from its idle position shown in FIG. 5A into engagement either with ring gear 64 as shown in FIG. 6A to select the same direction operational mode or alternatively into engagement with secondary sun gear 68 as shown in FIG. 7A to select the counter direction operational mode. This can be done simply by grabbing and rotating cross pin handle 76 by 90° in one direction or the other from its idle position. Since cross pin handle 76 is located outside of gearbox 26 and is thus easily accessible to the user, the selection by the user of the mode of operation of turf groomer can be made by manipulation of cross pin handle 76 without having to open or disturb gearbox 26, thus making the selection very quick and easy.

In considering the operation of turf groomer 20 in its bidirectional operational modes, the Applicants realized that the forward motion of cutting unit 2 is additive to the rotational speed of turf groomer 20 in the counter direction mode of operation but is subtractive to the rotational speed of turf groomer 20 in the same direction mode of operation. This led the Applicants to the further realization that using the same rotational speed for turf groomer 20 in both modes would lead to a somewhat poorer result in one of the modes of operation. For example, if the rotational speed were set to provide a good result in the same direction mode of operation, the same rotational speed in the counter rotation mode of operation would cause turf groomer 20 to be too aggressive on the turf and to cut or remove more material that is necessary for good results. This more aggressive action could potentially damage the turf or at the very least result in an increase in power required for operating turf groomer 20, thus leading to power inefficiencies.

Accordingly, in turf groomer 20 of this invention, rotary gear drive 28 is configured through the size of the various gears to provide a higher rotational speed of turf groomer 20 in the same direction mode of operation and a slower rotational speed of turf groomer 20 in the counter direction mode of operation. For rotation in the same direction mode of operation, the Applicants discovered that turf groomer 20 should rotate faster than cutting reel 8, preferably in the range of 1.3 to 1.5 times the rotational speed of cutting reel 8. The Applicants further discovered that in the counter direction mode of operation turf groomer 20 should rotate slower than in the same direction mode of operation and preferably no faster than cutting reel 8. For operation in the counter direction mode of operation, turf groomer 20 preferably should rotate in the range of 0.65 to 1.0 times the rotational speed of cutting reel 8. The above-described differences in rotational speed between the counter direction and same direction modes of operation give good turf grooming results in both cases and maximize power efficiency during turf grooming. These speed differences in the different modes result simply by design of the various gears in gear drive 28 and occur merely by selecting one or the other of the modes.

Another aspect of turf groomer 20 is the symmetrical design of gearbox 26 and rotary gear drive 28. In this respect, rotary gear drive 28 is symmetrical about a longitudinal plane that contains the rotational axes of input and output shafts 30, 32. This allows gearbox 26 to be inverted to be used on the opposite side of cutting unit 2, i.e. on the left side of cutting unit 2 compared to the right side of cutting unit 2 as shown in FIG. 1. When inverting gearbox 26 in this manner to change the drive to turf groomer 20 from one side to the other, i.e. to change a right hand drive as shown in FIG. 1 to a left hand drive, the only thing that needs to change is coupling member 40. When implementing a right hand drive, the threads on larger diameter section 44 of coupling member 40 will run in a first direction. When inverting gearbox 26 to implement a left hand drive, an alternative coupling member 40 is needed in which the larger diameter section 40 is provided with threads that run in the opposite direction.

Thus, when changing the drive from a right hand to a left hand drive or vice versa, the coupling member 40 being used in the first instance is removed and replaced with the alternative coupling member 40. In each case, the coupling member 40 that is required for use must have threads on the larger diameter section 44 of coupling member 40 that wind in a direction that will naturally tighten during operation of reel shaft 8 and turf groomer 20. Since the bores 38 in opposite ends of reel shaft 8 have threads that wind in opposite directions, so too must the threads on the larger diameter sections of the two different coupling members 40. While two different coupling members 40 have to be provided with one being used for a left hand drive and the other for a right hand drive, gearbox 26 itself is the same for both sides and can be manufactured as a common component for either left or right hand drive. Thus, manufacturing a single common gearbox 26 and two alternatively usable coupling members 40, is far more economical than having to manufacture two completely different turf groomers using two different gearboxes. This will lead to various cost efficiencies in manufacturing and ultimately for the end user purchaser.

Finally, gearbox 26 when installed between reel shaft 10 and turf groomer 20 is supported by cutting unit 2 at only two points, namely at the connection of input shaft 30 to reel shaft 10 of cutting reel 8 and by attachment to the lower end of a vertical height adjusting rod 84 of a height adjuster 86 that is used for adjusting the height of turf groomer 20 relative to the ground. Height adjuster 86 and the attachment of rod 84 thereof between a pair of spaced ears 88 on gearbox 26 are shown in FIG. 1. However, unlike many conventional gearboxes for known turf groomers in which the gearbox 26 would additionally be bolted to and supported by side plate 6, there are no fastening bolts that pass through gearbox 26 and into various bolt receiving holes or slots on side plate 6. As a consequence, there are fewer tolerance issues presented in manufacturing gearbox 2 since gearbox 26 does not need to be precisely located on side plate 6 since the need for alignment of fastening bolts with bolt receiving holes or slots in the side plate is now absent. This simplifies the manufacturing of gearbox 26 and the attachment of gearbox 26 to cutting unit 2.

Various modifications of this invention will be apparent to those skilled in the art. The invention is not limited to the details of the preferred embodiment disclosed herein. For example, the drive between reel shaft 10 and turf groomer 20 need not necessarily comprise a gearbox 26 having a rotary gear drive 20, but could comprise other types of drive transmissions providing bidirectional operation with different speeds being used in each direction. Thus, the scope of the invention is to be limited only by the appended claims.

The invention claimed is:

1. A reel mower, which comprises:
    (a) at least one reel cutting unit for cutting grass on a turf surface, the reel cutting unit having a rotatable cutting reel that pushes uncut grass against a bedknife for cutting the grass;
    (b) a rotatable turf groomer for additionally acting on the turf surface during a grass cutting operation; and
    (c) a drive system for rotating the turf groomer, wherein the drive system comprises:
        (i) a first drive path for rotating the turf groomer in a same direction mode of operation in which the turf groomer rotates in the same direction as a direction of rotation of the cutting reel at a first rotational speed;
        (ii) a second drive path for rotating the turf groomer in a counter direction mode of operation in which the turf groomer rotates in an opposite direction to the direction of rotation of the cutting reel at a second rotational speed that is different from the first rotational speed; and
        (iii) an actuator that is selectively movable by a user, the actuator being operatively connected to a movable portion of the drive system to move the drive system portion between a first operational position within the first drive path to enable the first drive path and to disable the second drive path and a second operational position within the second drive path to enable the second drive path and disable the first drive path, wherein the drive system provides different directions of rotation and different rotational speeds for the turf groomer in the different directions of rotation depending upon which operational position of the drive system portion has been selected by the user through manipulation of the actuator by the user.

2. The reel mower of claim 1, wherein the turf groomer is located in advance of the cutting reel taken with respect to a forward direction of motion of the reel cutting unit during the grass cutting operation.

3. The reel mower of claim 2, wherein the bottom of the cutting reel is rotating toward the bedknife and the bottom of the turf groomer is rotating towards the cutting reel in the same direction mode of operation.

4. The reel mower of claim 3, wherein the first rotational speed of the turf groomer in the same direction mode of operation is higher than the second rotational speed of the turf groomer in the counter direction mode of operation.

5. The reel mower of claim 4, wherein the first rotational speed of the turf groomer in the same direction mode of operation is higher than the rotational speed of the cutting reel and the second rotational speed of the turf groomer in the counter direction mode of operation does not exceed the rotational speed of the cutting reel.

6. The reel mower of claim 1, wherein the drive system comprises a rotary gear drive having an input shaft, an output shaft, and an epicyclic gear system arranged between the input and output shafts, wherein the epicyclic gear system comprises a primary sun gear, a ring gear, a plurality of planet gears extending between and engaging with the primary sun gear and the ring gear, and a secondary sun gear that does not directly engage the ring gear but is fixed to the primary sun gear for rotation with the primary sun gear as a unit.

7. The reel mower of claim 6, wherein the movable drive system portion comprises an input gear on the input shaft, and wherein the drive paths comprise the following:
(a) the first drive path having the input gear moved into the first operational position to operatively rotate the ring gear to thereby rotate an output gear on the output shaft with the rotation of the planet gears, the primary sun gear and the secondary sun gear serving as non-power transmitting idler gears; and
(b) the second drive path having the input gear moved into the second operational position to operatively rotate the secondary sun gear to thereby transfer power to the ring gear and to the output gear through the primary sun gear and the planet gears such that the entire epicyclic gear system is power transmitting.

8. The reel mower of claim 7, wherein the selection of the first or second drive path is achieved selectively by the user by manipulating the actuator to axially slide the input gear on the input shaft from the first operational position in which the input gear engages the ring gear to the second operational position in which the input gear engages the secondary sun gear.

9. The reel mower of claim 1, wherein the first and second drive paths and the movable portion of the drive system are enclosed within a drive housing, and wherein a portion of the actuator extends outside of the drive housing to permit the user to manually select either the first or second drive path from a position exterior to the drive housing without having to disassemble the drive housing.

10. The reel mower of claim 1, wherein the actuator is configured to move the movable portion of the drive system into a third operational position in which the movable portion of the drive system is not within either the first drive path or the second drive path to provide an idle mode in which the turf groomer is not being rotationally driven.

* * * * *